Dec. 20, 1955  P. H. BINDEL  2,727,690
BUSINESS MACHINE
Filed Dec. 1, 1954  4 Sheets-Sheet 1

INVENTOR.
Paul H. Bindel
BY
Smith, Olsen, Baird & Gulbrandsen
Attys.

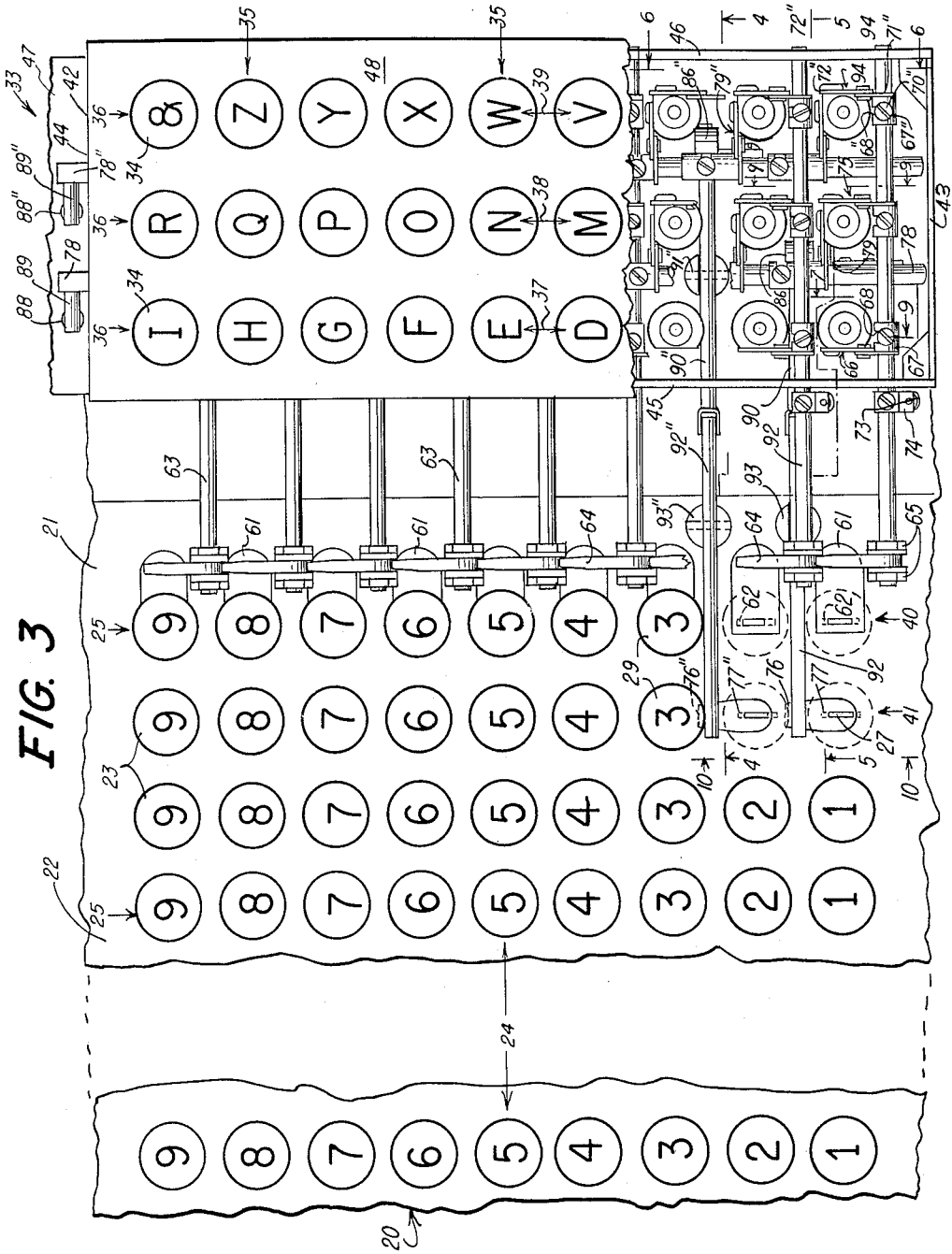

Dec. 20, 1955    P. H. BINDEL    2,727,690
BUSINESS MACHINE
Filed Dec. 1, 1954    4 Sheets-Sheet 3
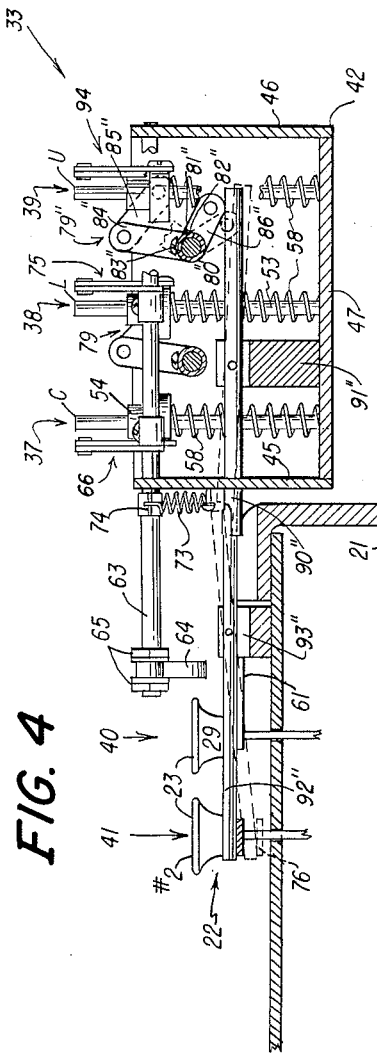
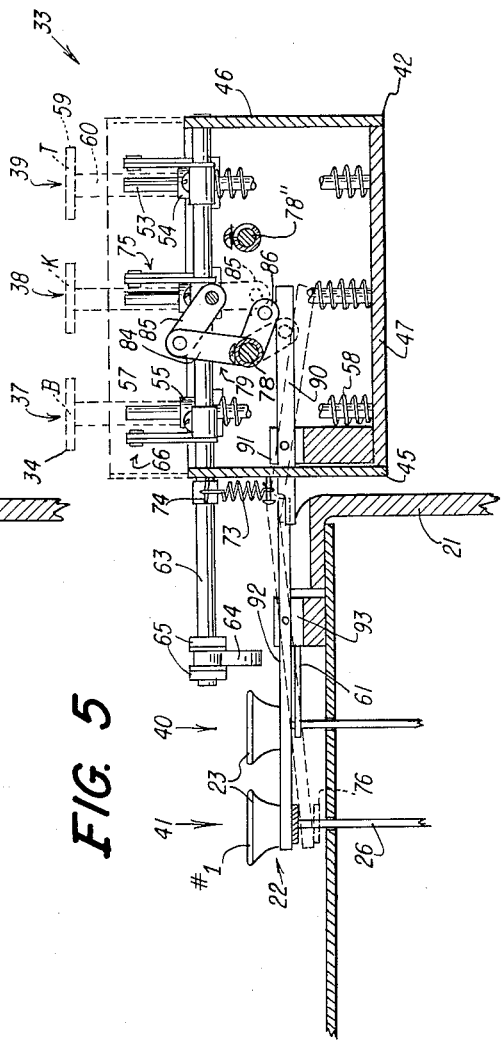
INVENTOR.
Paul H. Bindel
BY
Smith, Olsen, Baird & Gulbrandsen
Attys.

Dec. 20, 1955 P. H. BINDEL 2,727,690
BUSINESS MACHINE
Filed Dec. 1, 1954 4 Sheets-Sheet 4
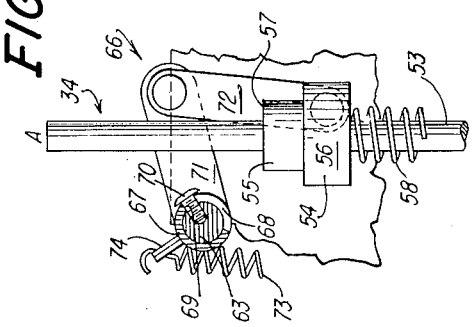
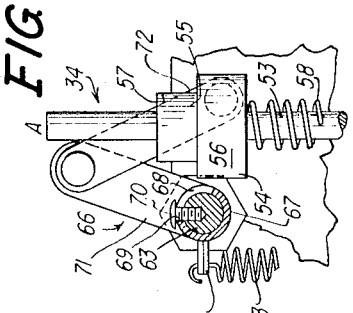
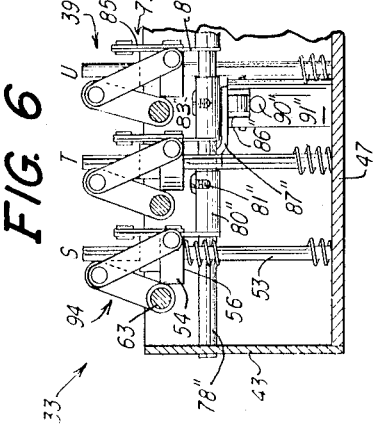
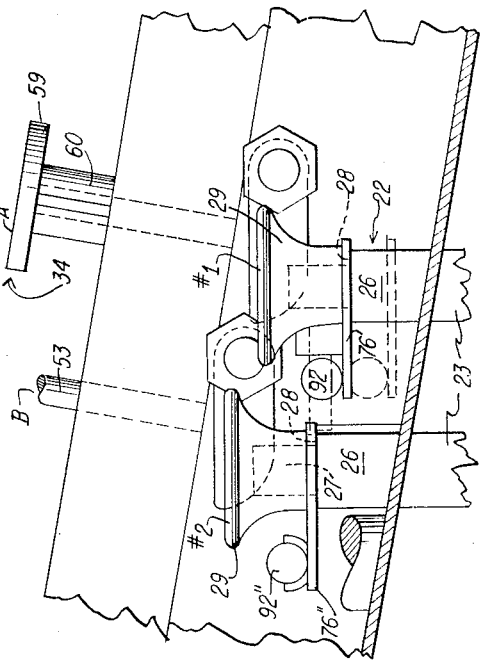
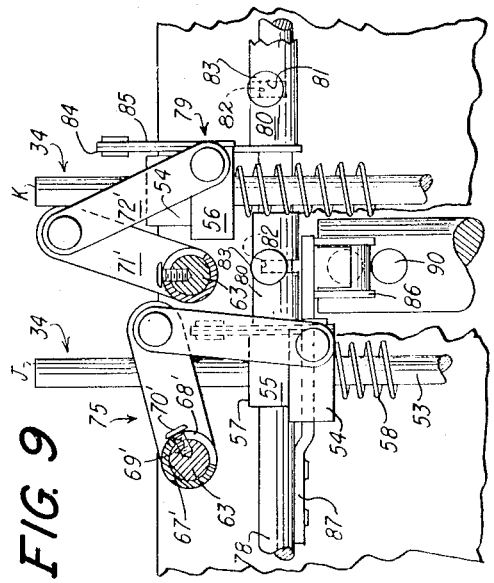
INVENTOR.
Paul H. Bindel
BY
Smith, Olsen, Baird & Gulbrandsen
Attys

United States Patent Office 2,727,690
Patented Dec. 20, 1955

2,727,690

BUSINESS MACHINE

Paul H. Bindel, Chicago, Ill.

Application December 1, 1954, Serial No. 472,492

8 Claims. (Cl. 235—146)

The present invention relates to a business machine and more particularly to a business machine having an auxiliary keyboard for use as a codifying device.

In the course of general office procedure it is often desirable to codifying the names of office personnel, business accounts, etc., appearing on financial data such as payroll lists, account books and the like, so as to maintain a degree of discreetness regarding income and disbursements. Such financial data is itself usually prepared by use of a machine such as a calculating machine or the like. Accordingly, it is a general object of this invention to provide in a business machine having a main keyboard adapted primarily for independent use in the same manner as the keyboard of a conventional calculating machine for tabulating numerical data on a tape or card, an auxiliary keyboard for use as a codifying device cooperating with the keys of the main keyboard whereby, through operation of the auxiliary keyboard, the name of the account or person associated with the tabulated data may be recorded on the tape or card by a series of representative numbers arranged according to a predetermined code.

Another object of the invention is to provide a business machine having a main keyboard and a detachable auxiliary keyboard, the auxiliary keys of which may be detachably connected to certain keys of the main keyboard by mechanism accommodating selective operation of the connected main keys independently of the auxiliary keys, and which mechanism is responsive to individual operation of the auxiliary keys for actuating the individual respective main keys connected thereto.

A further object of the invention is to provide a business machine having a main keyboard provided with a plurality of main keys arranged in coordinate ranks and files, the keys in each file respectively corresponding to numbers in the same numerical order, and a detachable auxiliary keyboard provided with a plurality of auxiliary keys respectively corresponding to letters of the alphabet, each auxiliary key being detachably connected to a representative main key or plurality of main keys by mechanism accommodating selective operation of the connected main keys independently of the auxiliary keys and being responsive to individual operation of the auxiliary keys, the construction and arrangement being such that the letters on the auxiliary keyboard may be entered into the machine and recorded by a series of representative numbers.

Yet another object of the invention is to provide a business machine as described above, wherein the auxiliary keyboard is easily detachable and embodies a compact construction facilitating its operation and repair in a simple and economical manner and accommodating ready assembly of the auxiliary keyboard with the main keyboard of the business machine.

Further features of the invention pertain to the particular arrangement of the elements of the combination whereby the above outlined and additional operating features are obtained.

The invention both as to organization and method of operation, together with further objects and advantages thereof, will best be understood by reference to the following specification taken in connection with the accompanying drawings in which:

Fig. 3 is an enlarged fragmentary plan view of the machine with portions broken away to illustrate more clearly the mechanism interconnecting the keys of the auxiliary keyboard and certain keys of the main keyboard;

Fig. 4 is an enlarged fragmentary view in elevation taken along the line 4—4 of Fig. 3, and showing more particularly a portion of the means interconnecting a third file of auxiliary keys and a second key in the second file of main keys;

Fig. 5 is an enlarged fragmentary view in elevation taken along the line 5—5 of Fig. 3, and showing more particularly a portion of the means interconnecting the second file of auxiliary keys and the first key in the second file of keys on the main keyboard;

Fig. 6 is an enlarged fragmentary view in elevation taken along the line 6—6 of Fig. 3, showing a portion of the mechanism for interconnecting the third file of auxiliary keys and the second key in the second file of main keys, and showing in addition a portion of the means interconnecting the third file of auxiliary keys and the first file of main keys;

Fig. 7 is an enlarged fragmentary view in elevation taken along the line 7—7 of Fig. 3, showing a portion of one representative auxiliary key and its associated connecting means in a retracted position;

Fig. 8 is an enlarged view similar to Fig. 7 but illustrating the same mechanism when in a depressed position;

Fig. 9 is an enlarged fragmentary view in elevation taken along line 9—9 of Fig. 3, showing the first key in the second file of auxiliary keys in a depressed position and the second key in the second file of auxiliary keys in a retracted position; and Fig. 10 is an enlarged fragmentary view in elevation taken along line 10—10 of Fig. 3, showing more particularly the positions of interconnecting means operative with the first and second keys in the second file of main keys.

Figure 1:
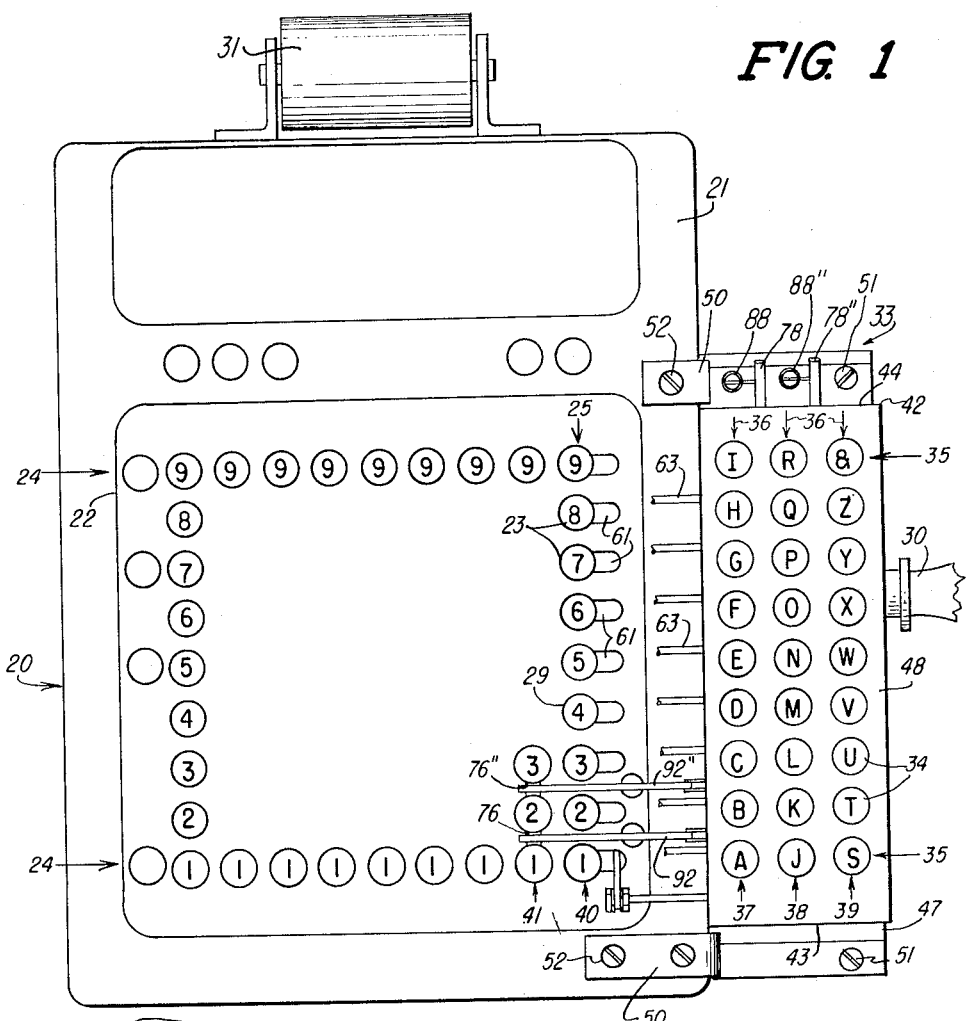
Fig. 1 is a plan view of the business machine of the invention, showing the main keyboard with the auxiliary keyboard attached thereto.

Referring now to Fig. 1 of the drawings, the business machine 20 there illustrated embodying the features of the present invention, comprises a frame 21 and main keyboard 22 of any conventional business machine, disclosed herein for the purpose of simplification, as a conventional adding machine. The keyboard 22 includes a plurality of depressible and automatically retractable main keys 23 arranged in coordinate parallel ranks 24 and files 25, each file consisting of keys corresponding to the digits 1 through 9, inclusive, arranged in progressive numerical order from the front of the machine to the rear thereof. As best seen in Fig. 10, each main key 23 is constructed in the conventional manner and embodies a rectangular stem 26 having a reduced upper tongue 27 forming a shoulder 28 with the lower portion of the stem, each stem receiving a detachable numbered finger cap 29. The main keys 23 are operative, when depressed, for entering into the machine the corresponding one of the digits carried by the depressed key whereinafter a lever 30 or the like is operative, in the well known manner, for clearing the machine and recording the proper numerical data on a tape 31 carried on a suitable roll at the rear of the machine.

Further, the business machine includes a detachable auxiliary keyboard 33 attached to the frame 21 and including a plurality of auxiliary keys 34 arranged in coordinate ranks 35 and files 36, each of the nine ranks 35 being substantially aligned with a corresponding rank 24 of the main keyboard. Each of the three files 36 of auxiliary keys respectively corresponds to a series of letters arranged in alphabetical order from the front of the machine to the rear thereof, the first file 37 including the letters A through I, inclusive, the second file 38 including the letters J through R, inclusive, and the third file 39 including the letters S through Z, inclusive, the last key in the third file being adapted for receiving any suitable symbol such as "&."

The business machine 20 comprises means for interconnecting the auxiliary keys 34 and certain of the main keys 23 in a manner accommodating selective operation of each main key independently of the auxiliary keys and whereby the letters in the auxiliary keyboard may be entered into the business machine by a series of representative numbers, each number having a position in the series corresponding to the alphabetic position of the represented letter. More specifically, the arrangement of the means is such that depression of any individual auxiliary key A through I, inclusive, in the first file 37 of auxiliary keys, causes depression of the individual main key in the same rank in the first file 40 of main keys whereby the letters A to I, inclusive, may be entered into the business machine 20 by the representative numbers 1 to 9, inclusive, respectively. Also, depression of any individual auxiliary key J to R, inclusive, in the second file 38 of auxiliary keys, causes depression of the individual main key in the same rank in the first file 40 of main keys and in addition causes depression of the first (digit 1) key in the second file 41 of main keys whereby the letters J to R, inclusive, may be entered into the business machine 20 by the representative numbers 11 to 19, inclusive, respectively. Finally, depression of any individual auxiliary key S to Z, inclusive, in the third file 39 of auxiliary keys, causes depression of the individual main key in the same rank in the first file 40 of main keys and in addition causes depression of the second (digit 2) key in the second file 41 of main keys whereby the letters S to Z and the symbol &, inclusive, may be entered into the machine by the representative numbers 21 to 29, inclusive, respectively. In view of this general description of the business machine, it will be understood that an operator may use the main keys 23 independently of the auxiliary keys 34 for tabulating numerical data on the tape 31 and may thereafter identify the data with the codified name of the associated person or account by depressing the auxiliary lettered keys corresponding to the letters of the name, thereby entering into the machine and recording by operating lever 30, the corresponding group of representative numbers on the tape.

Figure 2:
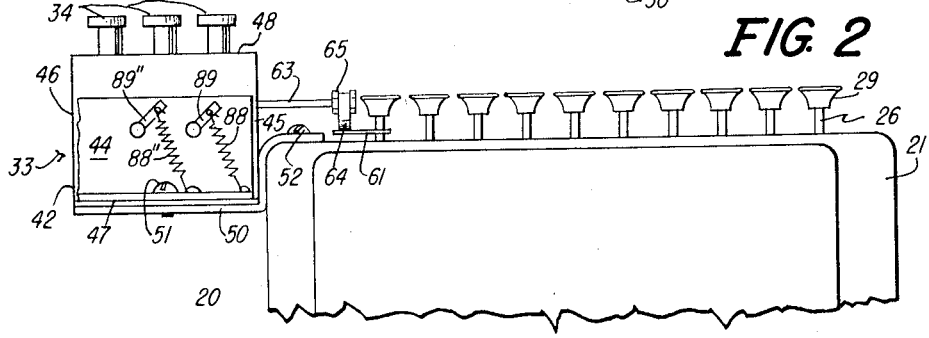
Fig. 2 is a rear elevational view of the business machine with the recording tape omitted.

Referring now more particularly to Figs. 1 to 3, inclusive, of the drawings, the auxiliary keyboard there illustrated comprises a box-like, rectangular casing 42 including end plates 43 and 44, side plates 45 and 46, a bottom plate 47, and a removable cover plate 48 provided with a plurality of apertures (not shown) for receiving the auxiliary keys 34. The casing may be detachably secured in the position shown most clearly in Figs. 1 and 2 by an elbow bracket 50 located at each end of the casing, each of which brackets is secured at its lower end to the bottom plate 47 as by screws 51 and secured at its upper end to the upper right-hand side of the frame 21 as by screws 52 threadably received in the frame. As previously noted, the auxiliary keyboard 33 further comprises the plurality of auxiliary keys 34 arranged in coordinate ranks 35 and files 36. Each rank 35 is substantially aligned with a rank 24 of main keys and each file 36 accordingly includes nine keys, there being three files of auxiliary keys arranged substantially parallel to the files 25 of main keys.

The auxiliary keys 34 are of substantially identical construction and as best shown in Figs. 5, 7, 9 and 10 each embodies an upstanding cylindrical stem 53 secured at its lower end to the bottom plate 47 and carrying a slidable collar 54 provided with a cylindrical neck 55 and an enlarged lower portion 56, the neck having an upper planar bearing surface 57. The collar is biased into a normal upper retracted position by a coiled spring 58 surrounding the stem 53 between the bottom plate and the underside of the enlarged lower portion 56. As best seen in Figs. 5 and 10, the collar is provided with a button-like cap 59 including a lower tubular portion 60 extending slideably through an aperture (not shown) in the cover plate 48 and telescopically receiving the upper free end of the upstanding stem 53. The lower end of the tubular portion 60 engages and rests upon the bearing surface 57 so that the cap 59 functions as a finger engageable actuator for depressing the collar 54 against the action of the spring 58. The upper surface of each cap 59 is adapted for receiving a symbol as a letter or the like and, as previously noted, the first file 37 of auxiliary keys includes the letters A to I, inclusive, the second file 38 includes the letters J to R, inclusive, and the third file 39 includes the letters S to Z and the symbol &, inclusive.

Also the invention comprises mechanism accommodating selective operation of the main keys 23 independently of the auxiliary keys 34 and responsive to the operation of any individual key in the first file of auxiliary keys A to I, inclusive, for operating the individual main key in the same rank in the first file 40 of main keys. As best seen in Figs. 1 to 3, inclusive, each main key in the first file 40 of main keys is provided with a detachable cam plate 61 provided with a rectangular slot 62 (Fig. 3), each of the plates having a portion thereon disposed toward the aligned rank of auxiliary keys and adapted to be depressively engaged by a cam finger, as subsequently described. Each cam plate may be assembled upon a particular main key 23 by removing the cap 29 and slipping the plate and slot 62 over the tongue 27 until the plate bears on the stem shoulder 28, whereupon reassembly of the cap 29 fixedly secures the cam plate on the stem 26.

Each rank 35 of auxiliary keys is provided with a longitudinally extending cam shaft 63, each shaft having its right-hand end (as viewed in Figs. 3, 4 and 5) rotatably supported in the right-hand side plate 46 and being rotatably supported intermediate its ends in the left-hand side plate 45 of the casing 42. The left-hand portion of each shaft extends to a position laterally adjacent to and spaced slightly in front of one of the cam plates 61 and threadably carries an elongated, laterally extending cam finger 64 secured thereto as by nuts 65, the end portion of each cam finger extending rearwardly and overlying the adjacent cam plate and being operative, when swung downwardly into a lower operated position from a normally elevated position (Fig. 5), when the cam shaft is rocked clockwise (as viewed from the right-hand side of the casing 42), for engaging the associated cam plate and depressing the particular main key in the first file 40 of main keys.

The mechanism comprises a lost motion connection 66 (Fig. 3) between each collar 54 in the first file 37 of auxiliary keys and a respective forwardly associated cam shaft 63 for rocking the associated cam shaft in a clockwise direction when the particular cap 59, which bears on the collar, is depressed. As best shown in Figs. 3, 7 and 8, each lost motion connection 66 is of substantially identical construction and embodies a cylindrical sleeve 67 rotatably mounted on the particular associated cam shaft 63 and having an annular slotted cam track 68 facing the particular associated collar 54 and terminating to form a normally upwardly disposed shoulder 69 (Fig. 7). A cam follower 70 is fixed to the shaft 63 for riding movement in the cam track 68 and is normally disposed upwardly in engagement with the shoulder 69 when the cam finger 64, carried by the particular shaft 63 is in the normally elevated position. Thus the follower 70 is in engagement with the shoulder 69 when the sleeve 67 is rocked in a clockwise direction and imparts clockwise rotation to the shaft 63 for swinging the cam finger 64 into its lower operated position for depressing the particular main key associated therewith. Also the length of the cam track 68 is such that the follower 70 can ride free of the shoulder 69 in a clockwise direction and return, thus accommodating rocking of the shaft independently of the sleeve 67 for swinging the cam finger between normal and operated positions. Each sleeve 67 also is provided with a normally upstanding arm 71 having its lower end fixed to the sleeve 67 and its upper end pivotally connected to the upper end of a link 72 which is pivotally secured at its lower end to a collar 54 positioned rearward of each sleeve 67. Finally, the cam finger 64 is biased into its upper normal position and the cam follower 70 is biased into engagement with the cam track shoulder 69 by a coiled spring 73 connected between a lower portion of the left-hand side of the casing 42 and a forwardly extending arm 74 fixed to the cam shaft 63 (Figs. 4, 5, 7 and 8).

In view of the foregoing, it will be understood that depression of any key in the first file 37 of auxiliary keys causes depression of a collar 54 associated therewith and imparts clockwise rotation to a respective sleeve 67 and associated cam shaft 63 whereby the associated cam finger 64 is swung into engagement with and depresses the cam plate 61 and associated main key in the same rank in the first file 40 of keys in the main keyboard. Accordingly, the first auxiliary file of keys including the letters A to I, inclusive, may be entered into the adding machine by a series of representative numbers, 1 to 9, inclusive, respectively, each number having a position in the series corresponding to the alphabetic position of the represented letter.

Referring now more particularly to Figs. 3, 4, 5 and 9, inclusive, the invention further comprises mechanism accommodating selective operation of the main keys 23 independently of the auxiliary keys 34 and responsive to the operation of any individual key in the second file of auxiliary keys J to R, inclusive, for operating simultaneously the individual main key in the same rank in the first file 40 of main keys and also the first key or digit #1 key in the second file 41 of main keys.

As best shown in Figs. 3 and 9, each auxiliary key in the second file 38 of auxiliary keys is connected by a lost motion connection 75 to the same cam shaft 63 as operated by the auxiliary key in the same rank in the first file 37 of auxiliary keys. As most specifically shown in Fig. 9, each lost motion connection 75 is substantially identical in construction and function to the lost motion connections 66 and embodies the same parts 67' to 72', inclusive, respectively, (shown as primed numbers for purposes of clarity), the only structural difference being that the upstanding arms 71' and links 72' are attached to the right-hand side of the rotatable sleeves 67' and slidable collars 54, respectively. As previously noted, the length of the cam track 68' is such that the follower 70' can ride free of the shoulder 69' in a clockwise direction and return, thus accommodating rocking of the associated cam shaft 63 independently of the sleeve 67' for swinging the associated cam finger 64 between normal and operated positions. Thus, depression of any individual auxiliary key in the second file 38 of auxiliary keys operates to rock the particular associated cam shaft 63 independently of the auxiliary key in the first file 37 of auxiliary keys connected to the same shaft 63 by a lost motion connection 66.

Further, as shown in Figs. 1, 3, 5 and 10, the first key or digit #1 key in the second file 41 of main keys is provided with a cam plate 76 including a rectangular slot 77 (Fig. 3) which cam plate 76 is detachably assembled with the particular main key stem 26 in the same manner as cam plates 61 were assembled with the first file 40 of main keys, the cam plate 76 having a portion disposed rearwardly between the first and second ranks 24 of main keys for depressing engagement by a lever as subsequently described.

Finally the mechanism comprises a cam shaft and link arrangement whereby depression of any individual key in the second file 38 of auxiliary keys operates to depress the cam plate 76 and digit #1 key in the second file 41 of main keys. As best shown in Fig. 3, a cam shaft 78 is disposed longitudinally between the first file 37 and second file 38 of auxiliary keys and is supported for rotation at opposite ends in the end plates 43 and 44, respectively, of the casing 42. Each key in the second file 38 of auxiliary keys is connected to the shaft 78 by a lost motion connection 79 (Fig. 9) of substantially identical construction to lost motion connections 66 and 75 and being operative, upon depression of any individual key in the second file 38 of auxiliary keys, for rocking the shaft 78 in a clockwise direction (viewed from the front of the business machine 20). Each lost motion connection embodies a cylindrical sleeve 80 (Fig. 9) rotatably mounted on the shaft 78 and having an annular slotted cam track 81 facing the particular associated collar 54 in the second file 38 of auxiliary keys which cam track terminates to form a normally upwardly disposed shoulder 82. A cam follower 83 is fixed to the shaft 78 for riding movement in the cam track 81 and is normally disposed upwardly in engagement with the shoulder 82. When the sleeve 80 is rocked in a clockwise direction the shoulder imparts clockwise rotation to the shaft 78 through the cam follower 83. Also the length of the cam track 81 is such that the follower 83 can ride free of the shoulder 82 in a clockwise direction and return, thus accommodating rocking of the shaft by operation of any individual key in the second file 38 of auxiliary keys independently of the other auxiliary keys in the same file. Each sleeve 80 also is provided with a normally upstanding arm 84 having its lower end fixed to the sleeve 80 and its upper end pivotally connected to the upper end of a link 85 which is pivotally secured at its lower end to a particular collar 54. Also, as best shown in Figs. 5 and 9, the cam shaft 78 carries a normally elevated yoke and roller 86 fixed to the shaft 78 by an arm 87, which yoke and roller is also disposed between the first and second ranks of main and auxiliary keys for rocking motion between a normal elevated position (Fig. 5) and a lower operated position (Fig. 9) wherein the roller is operative for actuating link mechanism communicating with cam plate 76 for depressing the digit #1 key in the second file 41 of main keys. The roller 86 is spring biased into the normal elevated position by the action of a coiled spring 88 (Fig. 3) at each end of the cam shaft 78, one of which springs is shown connected at its upper end to an arm 89 fixed to the shaft 78 and connected at its lower end to the bottom plate 47 of the casing 42 (Fig. 2).

The link mechanism comprises a first lever 90 (Fig. 5) disposed beftween the first and second ranks of auxiliary and main keys and pivotally mounted left of center to a stud 91 carried by the bottom plate 47. The right-hand end of the lever 90 underlies the roller 86 and is arranged to be depressed by the roller when swung into its operated position by the rocking motion of cam shaft 78. The left-hand end of the lever engages the underside of the right-hand end of a second lever 92, which second lever is longitudinally disposed with respect to the first lever 90. Also, the second lever 92 is pivotally mounted right of center to a stud 93, threadably received in the frame 21, the left-hand end of the lever 92 overlying and resting on cam plate 76 for depressing the cam plate and associated digit #1 key in the second file 41 of main keys when the roller 86 is in the operated position.

In view of the foregoing, it will be understood that depression of any key in the second file 38 of auxiliary keys causes depression of a collar 54 associated therewith and imparts clockwise rotation to a respective sleeve 67' and associated cam shaft 63 whereby the associated cam finger 64 is swung into engagement with and depresses the cam plate 61 and associated main key in the same rank in the first file 40 of main keys. Simultaneously, depression of the collar 54 imparts clockwise rotation to a respective sleeve 80 and the cam shaft 78 whereby the roller 86 is swung into the lower operated position, depressing the right-hand end of lever 90 which causes depression of the left-hand end of lever 92, cam plate 76 and the digit #1 key in the second file 41 of main keys. Accordingly, the second auxiliary file of keys including the letters J to R, inclusive, may be entered into the adding machine by a series of representative numbers 11 to 19, inclusive, respectively, each number having a position in the series corresponding to the alphabetic position of the represented letter.

Referring now more particularly to Figs. 1, 3, 4, 6 and 10, the invention further comprises mechanism accommodating selective operation of the main keys 23 independently of the auxiliary keys 34 and responsive to the operation of any individual key in the third file of auxiliary keys S to Z and the symbol &, inclusive, for operating simultaneously the individual main key in the same rank in the first file 40 of main keys and also the second key or digit #2 key in the second file 41 of main keys.

As best shown in Fig. 3, each auxiliary key in the third file 39 of auxiliary keys is connected by a lost motion connection 94 to the same cam shaft 63 as operated by the auxiliary keys in the same rank in the first file 37 and second file 38 of auxiliary keys. As most specifically shown in Fig. 3, each lost motion connection 94 is substantially identical in construction and function to the lost motion connections 66 and 75 and embodies the same parts 67" to 72", inclusive, respectively (shown as double primed numbers for purposes of clarity). The depression of any individual auxiliary key in the third file 39 of auxiliary keys operates to rock the particular associated cam shaft 63 independently of the auxiliary keys in the first file 37 and second file 38 which are connected to the same shaft 63 by lost motion connections 66 and 75 respectively.

Further, as best shown in Fig. 3, the second key or digit #2 key in the second file 41 of main keys is provided with a cam plate 76" including a rectangular slot 77" which cam plate is substantially identical to and detachably assembled with the particular main key stem 26 in the same manner as cam plate 76, the cam plate 76" having a portion rearwardly disposed between the second and third ranks of main keys for depressing engagement by a lever as subsequently described.

Finally, the mechanism comprises a cam shaft and link arrangement whereby depression of any individual key in the third file 39 of auxiliary keys operates to depress the cam plate 76" and digit #2 key in the second file 41 of main keys. This cam shaft and link mechanism is substantially identical to the cam shaft and link mechanism operative with the second file 38 of auxiliary keys, previously described, and embodies substantially the same parts having substantially the same respective functions, which parts are designated hereinafter by double primed numbers for the purpose of clarity. As best shown in Fig. 3, a cam shaft 78" is disposed longitudinally between the second file 38 and the third file 39 of auxiliary keys and is supported for rotation at opposite ends in the end plates 43 and 44, respectively, of the casing 42. Each key in the third file 39 of auxiliary keys is connected to the shaft 78" by a lost motion connection 79" (Figs. 3, 4 and 6) and including the parts 80" to 85", inclusive, respectively (Fig. 6), which lost motion connection is operative, upon depression of any individual key in the third file 39 of auxiliary keys, for rocking the shaft 78" in a clockwise direction (viewed from the front of the business machine 20). Also, as best shown in Figs. 3, 4 and 6, the cam shaft 78" carries a normally elevated yoke and roller 86" fixed to the shaft 78" by an arm 87" which yoke and roller is also disposed between the second and third ranks of main and auxiliary keys for rocking motion between a normal elevated position (Fig. 4) and a lower operated position (indicated by dotted lines) wherein the roller is operative for actuating link mechanism communicating with cam plate 76" for depressing the digit #2 key in the second file 41 of main keys. The roller 86" is spring biased into the normal elevated position by the action of a coiled spring 88" (Fig. 3) at each end of the cam shaft 78", one of which springs is shown connected at its upper end to an arm 89" fixed to the shaft 78" and connected at its lower end to the bottom plate 47 of the casing 42 (Fig. 2).

The link mechanism comprises a first lever 90" (Figs. 3 and 4) pivotally mounted left of center to a stud 91" carried by the bottom plate 47. The right-hand end of the lever 90" underlies the roller 86" and is arranged to be depressed by the roller when swung into its operated position by the rocking motion of cam shaft 78". The left-hand end of the lever engages the underside of the right-hand end of a second lever 92" which second lever is longitudinally disposed with respect to the first lever 90". Also, the second lever 92" is pivotally mounted right of center to a stud 93", threadably received in the frame 21, the left-hand end of the lever 92" overlying and resting on cam plate 76" for depressing the cam plate and associated digit #2 key in the second file 41 of main keys when the roller 86" is in the operated position.

In view of the foregoing, it will be understood that depression of any key in the third file 39 of auxiliary keys causes depression of a collar 54 associated therewith and imparts clockwise rotation to a respective sleeve 67" and associated cam shaft 63 whereby the associated cam finger 64 is swung into engagement with and depresses the cam plate 61 and associated main key in the same rank in the first file 40 of main keys. Simultaneously, depression of the collar 54 imparts clockwise rotation to a respective sleeve 80" and the cam shaft 78" whereby the roller 86" is swung into the lower operated position for depressing the right-hand end of lever 90" which causes depression of the left-hand end of lever 92", cam plate 76" and the digit #2 key in the second file 41 of main keys. Accordingly, the third auxiliary file of keys including the letters S to Z and the symbol &, inclusive, may be entered into the adding machine by a series of representative numbers 21 to 29, inclusive, respectively, each number having a position in the series corresponding to the alphabetic position of the represented letter.

In the use of the business machine 20, it is pointed out that the auxiliary keyboard 33 is easily detachable from the main keyboard and is adapted for use with a variety of calculating machines. Also it is contemplated that the studs 93 and 93" may be carried by arms attached to the casing 42 and that the code as illustrated may be easily changed by varying the arrangement of the parts of the auxiliary keyboard 33 and the cam plates associated with keys of the main keyboard.

In view of the foregoing, it is apparent that there has been provided a business machine including a main keyboard for independent use in the same manner as the keyboard of a conventional calculating machine or the like, and also a detachable keyboard including a plurality of auxiliary keys each individually representing a letter of the alphabet, the arrangement being such that the keys of the main keyboard are operative independently of the auxiliary keyboard for tabulating numerical data on a tape whereinafter the auxiliary keys may be operated for recording on the tape in code, the name of the account or person associated with the data, which code embodies a series of representative numbers, each number having a position in the series corresponding to the alphabetic position of the represented letter.

While there has been described an embodiment of the invention, it will be understood that various modifications may be made therein, and it is intended to cover in the appended claims all such modifications as fall within the true spirit and scope of the invention.

What is claimed is:

1. In a business machine including a main keyboard provided with a plurality of main keys arranged in coordinate ranks and files and respectively corresponding to a plurality of first individual characters and individually operative to enter into said machine the corresponding one of said first characters; the combination comprising an auxiliary keyboard provided with a plurality of auxiliary keys arranged in coordinate ranks and files and respectively corresponding to a plurality of second individual characters, and link mechanism operatively interconnecting said auxiliary keys and said main keys, said mechanism accommodating selective operation of said main keys independently of said auxiliary keys and being responsive to operation of any individual auxiliary key in a first file of said auxiliary keys for operating the individual main key in the same rank in a first file of said main keys and responsive to operation of any individual auxiliary key in a second file of said auxiliary keys for operating both the individual main key in the same rank in said first file of said main keys and also a particular main key in a second file of said main keys.

2. In a calculating machine including a main keyboard provided with a plurality of main keys arranged in coordinate parallel ranks and files and respectively corresponding to a plurality of individual digits and individually operative to enter into said machine the corresponding one of said digits; the combination comprising an auxiliary keyboard provided with a plurality of auxiliary keys arranged in coordinate ranks and files substantially parallel with the ranks and files respectively of the main keyboard and respectively corresponding to a plurality of individual letters of the alphabet, and link mechanism operatively interconnecting said auxiliary keys and certain of said main keys, said mechanism accommodating selective operation of said main keys independently of said auxiliary keys and being responsive to operation of any individual auxiliary key in a first file of said auxiliary keys for operating the individual main key in the same rank in a first file of said main keys and being responsive to operation of any individual auxiliary key in a second file of said auxiliary keys for operating both the individual main key in the same rank in said first file of main keys and also a particular main key in a second file of main keys.

3. In a business machine including a main keyboard provided with a plurality of main keys arranged in coordinate ranks and files and respectively corresponding to a plurality of first individual characters and individually operative to enter into said machine the corresponding one of said first characters; the combination comprising an auxiliary keyboard provided with a plurality of auxiliary keys arranged in coordinate ranks and files and respectively corresponding to a plurality of second individual characters, and a plurality of independent link mechanisms, one for each rank of auxiliary keys, each of said mechanisms operatively interconnecting every key in its corresponding rank of auxiliary keys with a single corresponding main key of the same rank in a first file of said main keys, said link mechanisms accommodating selective operation of all of said main keys independently of said auxiliary keys and accommodating selective operation of each auxiliary key independently of the other auxiliary keys, each of said link mechanisms being effective upon actuation of any auxiliary key in its corresponding rank of auxiliary keys to operate the said single main key of the same rank in said first file of main keys.

4. The combination set forth in claim 3, wherein said link mechanisms are substantially identical and each comprises a shaft, means on said shaft for operating the said main key corresponding to said shaft when said shaft is rotated, and independent connecting means between said shaft and each auxiliary key in the rank of auxiliary keys corresponding to said shaft for rotating said shaft when any one of the latter of said keys is operated.

5. The combination set forth in claim 3, wherein said link mechanisms are substantially identical and each comprises a shaft, means on said shaft for operating the said main key corresponding to said shaft when said shaft is rotated, a plurality of collars rotatably mounted on said shaft, one collar for each auxiliary key in the rank of auxiliary keys corresponding to said shaft, each of said collars having a circumferentially extending elongated slot therein, individual radially extending projections on said shaft riding in each of said slots whereby rotation of any one of said collars will impart rotary motion to said shaft independently of movement of the other collars, and means connecting each collar to its corresponding auxiliary key for rotating that particular collar, and thereby rotating said shaft, when said corresponding auxiliary key is operated.

6. In a business machine including a main keyboard provided with a plurality of main keys arranged in coordinate ranks and files and respectively corresponding to a plurality of first individual characters and individually operative to enter into said machine the corresponding one of said first characters; the combination comprising an auxiliary keyboard provided with a plurality of auxiliary keys arranged in coordinate ranks and files and respectively corresponding to a plurality of second individual characters, a plurality of independent first link mechanisms, one for each rank of auxiliary keys, each of said first link mechanisms operatively interconnecting every key in its corresponding rank of auxiliary keys with an individual corresponding main key of the same rank in a first file of said main keys, and second link mechanism operatively interconnecting every auxiliary key in one file of auxiliary keys to a single key in a second file of said main keys, said link mechanisms accommodating selective operation of all of said main keys independently of said auxiliary keys and accommodating selective operation of each auxiliary key independently of the other auxiliary keys and being responsive to operation of any auxiliary key in said one file of auxiliary keys for operating both the said individual corresponding main key of the same rank in said first file of said main keys and also said single key in said second file of main keys.

7. The combination set forth in claim 6, wherein said second link mechanism comprises a shaft extending substantially parallel to said one file of auxiliary keys, means actuated by rotation of said shaft for operating said single key in said second file of said main keys, and independent connecting means between said shaft and each auxiliary key in said one file of said auxiliary keys for rotating said shaft when any one of the latter of said keys is operated.

8. In a calculating machine including a main keyboard provided with a plurality of main keys arranged in coordinate parallel ranks and files and respectively corresponding to a plurality of individual digits arranged from 1 to 9, inclusive, in numerical order in each file, each main key being individually operative to enter into said machine the corresponding one of said digits; the combination comprising an auxiliary keyboard provided with a plurality of auxiliary keys arranged in coordinate ranks and files, said plurality of auxiliary keys respectively corresponding to the letters of the alphabet arranged in alphabetical order from A to I, inclusive, in a first file of said auxiliary keys, from J to R, inclusive, in a second file of said auxiliary keys and from S to Z, inclusive, in a third file of said auxiliary keys, and link mechanism operatively interconnecting said auxiliary and main keys, said mechanism accommodating selective operation of the main keys independently of said auxiliary keys and being responsive to operation of any individual auxiliary key in said first file of auxiliary keys for operating the individual main key in the same rank in a first file of main keys and being responsive to operation of any individual auxiliary key in said second file of auxiliary keys for operating both the individual main key in the same rank in the first file of main keys and also the digit #1 key in a second file of main keys and being responsive to operation of any individual auxiliary key in said third file of auxiliary keys for operating both the individual main key in the same rank in the first file of main keys and also the digit #2 key in the second file of main keys whereby the first file of auxiliary keys including the letters A to I, inclusive, may be entered into said machine by a series of representative numbers 1 to 9, inclusive, respectively, and the second file of auxiliary keys including the letters J to R, inclusive, may be entered into said machine by a series of representative numbers 11 to 19, inclusive, respectively, and the third file of auxiliary keys including the letters S to Z, inclusive, may be entered into said machine by a series of representative numbers 21 to 28, inclusive, respectively.

No references cited.